J. S. ATKINSON.
JOURNAL BOXES AND BEARINGS.
No. 192,405. Patented June 26, 1877.
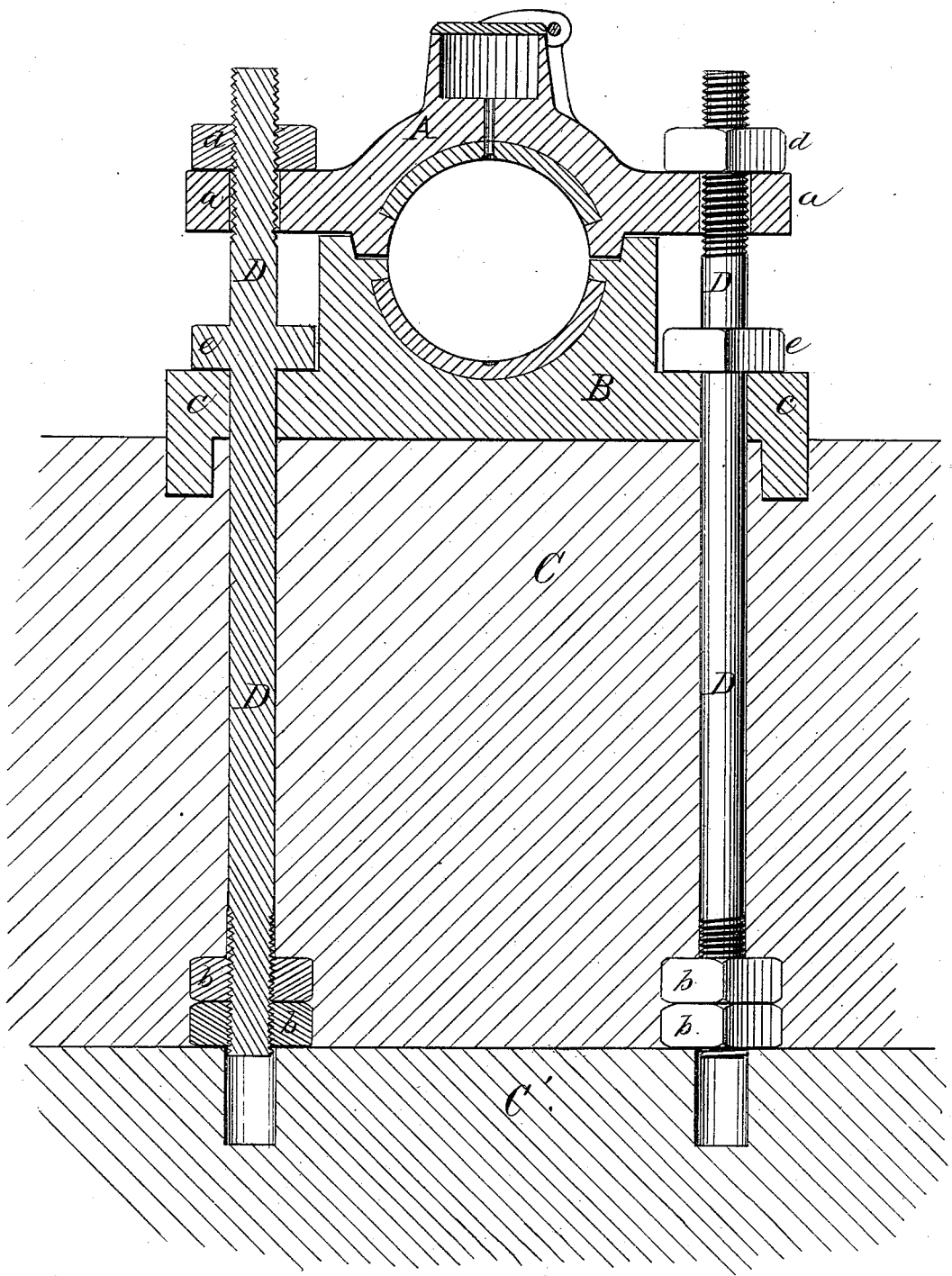

UNITED STATES PATENT OFFICE.

JAMES S. ATKINSON, OF PITTSBURG, PENNSYLVANIA, ASSIGNOR TO JONES & LAUGHLINS, OF SAME PLACE.

IMPROVEMENT IN JOURNAL BOXES AND BEARINGS.

Specification forming part of Letters Patent No. 192,405, dated June 26, 1877; application filed May 28, 1877.

*To all whom it may concern:*

Be it known that I, JAMES S. ATKINSON, of Pittsburg, county of Allegheny, State of Pennsylvania, have invented or discovered a new and useful Improvement in Journal Boxes or Bearings; and I do hereby declare the following to be a full, clear, concise, and exact description thereof, reference being had to the accompanying drawing, making a part of this specification, in which—like letters indicating like parts—

Figure 1 shows a transverse vertical section of my improved journal box or bearing.

In setting up shafting and various other parts of machinery it is often necessary to place the bearings or boxes in such positions that it is very difficult to reach the bolts and nuts which secure the box or bearing to its support, so as to tighten or loosen the same as occasion requires. This is especially the case in oil-well machinery, where a journal-bearing rests on the upper end of a vertical post or pillow-block, and the bolts which secure the box are passed down through longitudinal holes in the post, and nuts are let into such holes through openings in the sides of the posts.

When arranged in this way the nuts can be turned or manipulated only through such side openings by means of a set or similar tool, and in any case the operation is very tedious.

The essential feature of my invention consists in forming an open space at each end of the box and passing the bolts through such open space, the bolts being so formed as to enable them to be turned, while the covered nuts are stationary.

In the annexed drawing, A represents the cap of my improved journal-box; B, the bed-piece; C, a beam or timber, to which the box is secured by bolts D, in any desired number; and C′ represents additional timber-support or masonry.

The open spaces at the end of the box, through which the bolts pass, are formed by xtending the ends of the cap A and bed-piece B out beyond the side walls of the box, making thereby flanges $a\ c$. Holes are provided through these flanges for passing the bolts D, which secure the bed-piece to the support, and also bind the parts of the box together. The form of bolt shown has a fixed head or collar, $e$, which rests on the top of the flange $c$ of the bed-piece. The head $e$ may be of any form which will enable the bolt to be turned thereby.

The lower end of the bolt is threaded, and nuts $b$ screwed thereon. These nuts may be let into their place through any suitable opening; and in the form shown they are set into the timber, so as to be stationary, and are screwed on and off the bolt by turning the bolt from the head or collar $e$, as described.

The upper ends of the bolts pass up through the openings or holes in the flanges $a$, as shown, and a nut, $d$, on each binds the cap to the bed-piece independent of the fastening of the bed-piece to its support.

Collar-bolts such as are shown and described are in themselves old in the art; but I believe it to be new to provide openings in the ends of boxes or bearings, whereby ready access may be had to the collars of such bolts for the purpose of turning the bolts instead of their nuts, and so tightening the box whenever it works loose, or loosening the same for the purpose of removing it.

Under certain conditions a modification of the bolts D may be used—as, for example, the bolts may be stationary, having their heads at the end $b$, and their upper ends threaded down to or below the flanges $c$. A nut screwed down onto such flanges will operate to hold the bed-piece, and will be accessible through the opening between the cap A and bed-piece B, substantially as before described.

I claim herein as my invention—

The combination of box A B, having flanges $a\ c$, and bolts D, adapted to be tightened on the lower flange by the use of a wrench or like tool applied between the flanges, substantially as set forth.

In testimony whereof I have hereunto set my hand.

JAMES S. ATKINSON.

Witnesses:
J. J. McCORMICK,
CLAUDIUS L. PARKER.